(12) United States Patent
Thiele et al.

(10) Patent No.: US 6,346,559 B1
(45) Date of Patent: *Feb. 12, 2002

(54) POLYURETHANE FOAM AND ASSOCIATED PROCESS FOR PRODUCTION

(75) Inventors: Karl-Heinz Thiele, Duderstadt; Peter Gansen, Seeburg, both of (DE)

(73) Assignee: Otto Bock Schaumstoffwerke GmbH & Co. KG, Duderstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/706,479

(22) Filed: Nov. 3, 2000

(30) Foreign Application Priority Data

Nov. 3, 1999 (DE) .......................................... 199 53 060
Jan. 8, 2000 (DE) .......................................... 100 00 494

(51) Int. Cl.⁷ .............................................. C08G 18/14
(52) U.S. Cl. ........................ 521/128; 521/129; 521/130; 521/163; 521/170; 521/172; 521/174
(58) Field of Search ................................. 521/129, 170, 521/172, 174, 163, 128, 130

(56) References Cited

U.S. PATENT DOCUMENTS

| | | | |
|---|---|---|---|
| 2,764,565 A | | 9/1956 | Hoppe et al. |
| 3,178,490 A | | 4/1965 | Petrino et al. |
| 3,182,104 A | | 5/1965 | Cwik |
| 5,834,579 A | * | 11/1998 | Konig et al. ............ 521/129 |
| 6,077,877 A | * | 6/2000 | Gerkin et al. ............ 521/174 |

FOREIGN PATENT DOCUMENTS

| | | |
|---|---|---|
| DE | 2 132 102 | 1/1972 |
| DE | 2 200 480 | 7/1972 |
| DE | 28 32 253 | 1/1980 |
| EP | 0 121 850 | 10/1984 |
| EP | 0 652 250 | 5/1995 |

OTHER PUBLICATIONS

Kunststoff–Handbuch [Plastic Handbood], vol. V11, published by Vieweg und Höchtlen, Carl Hanser Verlag, Munich 1966, pp. 103–113 and 121–205.

* cited by examiner

Primary Examiner—John M. Cooney, Jr.
(74) Attorney, Agent, or Firm—Husch & Eppenberger, LLC; Robert E. Muir

(57) ABSTRACT

A polyurethane foam and associated production process, in particular flexible to semi-hard block foams or soft molded foams, using polyesters or polyethers as polyols. A carbamate, or a mixture of carbamates, is used simultaneously as propellant and as catalyst, wherein the carbamate or the carbamates have the general Formula I

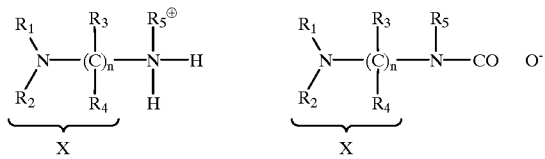

wherein:

$R_1$ and $R_2$ represent the same or different alkyl radicals, $R_3$ and $R_4$ represent the same or different radicals and denote hydrogen or alkyl radicals, $R_5$ denotes hydrogen, an alkanol radical, a polyether monool radical or the alkyl radical, characterized by X and n represents 2 or 3.

32 Claims, No Drawings

POLYURETHANE FOAM AND ASSOCIATED PROCESS FOR PRODUCTION

BACKGROUND OF THE INVENTION

The present invention relates to a polyurethane foam and associated production process, in particular flexible to semi-hard block foams or soft molded foams using polyesters or polyethers as polyols.

Polyurethane foams are conventionally produced by mixing a polyisocyanate component of at least one diisocyanate or polyisocyanate with a polyol component of at least one polyether polyol or polyester polyol, in the presence of at least one catalyst and at least one propellant and optionally in the presence of various auxiliaries and additives well known in polyurethane chemistry.

The properties of the polyurethane foams may be adjusted within wide ranges by specific co-use of low molecular diols as chain extenders or of triols and amines as crosslinkers.

Mainly carbon dioxide or halogen alkanes are generally used as propellants for polyurethane foams. Selection of the propellant depends, inter alia, on the reaction mixture to be foamed, the required strength and further properties of the formed polyurethane foam. In addition to water, fluorochlorohydrocarbons (FCHC), hydrogen fluorochlorohydrocarbons (HFCHC), hydrogen fluorohydrocarbons (HFHC) or special carbamates in particular, have been used as propellants for the production of harder polyurethane foams.

Due to the known ecological problems associated with the use of said halogen-containing propellants, their use is continuously minimized in the field of foams.

Use of hydrocarbons, such as isomeric pentanes or of cyclopentanes, as propellants is rare due to the flammability of these substances.

The conventional propellant in the production of flexible block foams or molded foams is water, which is reacted in the reaction with isocyanates to produce carbon dioxide and urea. The sole use of water as a propellant may have the disadvantage of the production of urea that reduces the elasticity of the resulting foams.

Tertiary amines and organic compounds generally serve as catalysts for producing polyurethane foams. Co-catalysis, for example by metal catalysts, is also possible. Catalysts which can be incorporated and are bound into the polymer matrix of a polyurethane foam, via a primary or secondary amine function or via hydroxyl groups, may be used in the production of flexible to semi-hard block foams or molded foams. However, these catalysts have severe disadvantages.

First of all, such catalysts have to be used with a suitable co-catalysis. Inadequate curing results without use of a suitable co-catalysis.

Furthermore, most known catalysts can lead to a phenomenon in block foams which is known as "core discoloration", that is, the start of oxidative decomposition in the center of the foam block due to the resulting heat of reaction. Catalysis typically cannot be controlled or can be controlled only with difficulty in block foams. It is particularly difficult to adjust the critical ratio of open and closed cells as well as cell opening at the right point in time.

A further difficulty is the deterioration in hydrolysis aging, which results particularly for block foams based on polyester.

When using amine catalysts, there are additional problems with possible persistent amine exhalation, which may lead to odor pollution or even health stresses. Odor pollution is a particular problem in block foams based on polyester.

European granted patent 0 121 850 indeed already describes the use of certain carbamates which carry hydroxyl groups as propellants for polyurethane foams, as can be seen from the exemplary embodiments, preferably in combination with other propellants. However, European granted patent 0 121 850 does not disclose any indication of the surprising finding that the carbamates may also be used as catalysts for the production of polyurethane foams. Due to the special constitution of the carbamates given there, the latter cannot also replace the tertiary amine catalysts.

European granted patent 0 652 250 describes the use of carbamates containing hydroxyl groups as exclusive propellant for integral foams. Here too, it is not a question of the replacement of catalysts. Rather, catalysts are thus used which lead to the above-mentioned undesirable accompanying phenomena, such as odor pollution and PVC discoloration.

The present invention is directed to overcoming one or more of the problems set forth above.

SUMMARY OF THE INVENTION

An aspect of the invention is therefore to provide a process for producing polyurethane foam, in which the co-use of environmentally damaging propellants and largely traditional amine catalysts is unnecessary. The aim is thus to achieve significantly reduced core discoloration and significantly lower odor evaporation than for conventional foams in block foams with similar physical properties.

It has now been found, surprisingly, that certain carbamates of the type described below in more detail are catalysts and at the same time propellants and facilitate the production of polyurethane block foams, especially flexible to semi-hard block foams as well as soft molded foams. The use of additional propellants may thus be completely or partly omitted. Furthermore, traditional amine catalysts are unnecessary. However, co-catalysis, such as metal catalysts, using other catalysts to form polyurethane may be used.

DETAILED DESCRIPTION

The invention provides a process for producing polyurethane foam in the presence of at least one catalyst and at least one propellant, where a carbamate or a mixture of carbamates of the general formula that is hereinafter referenced as "Formula I":

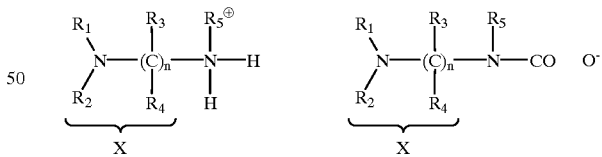

wherein:
$R_1$ and $R_2$ represent the same or different alkyl radicals,
$R_3$ and $R_4$ represent the same or different radicals and denote hydrogen or alkyl radicals,
$R_5$ denotes hydrogen, an alkanol radical, a polyether monool radical or the radical characterized by X,
n represents 2 or 3,
and said carbamate or mixture of carbamates is used as catalyst and at the same time as propellant, essentially excluding amine catalysts.

The process produces polyurethane foams, in particular block foams and soft foams, which have significantly reduced core discoloration and a significantly lower odor than foams produced using conventional catalysts, but with the same strength.

The foams produced according to the invention are characterized by a lower bulk density, compared to foams which have been produced using the same water content, problem-free processing, reduced amine emissions and good stability to hydrolysis. There is no oxidative core discoloration in block foams.

An alkanol radical is understood to mean groups generally known to the chemist under this term, such as for example a methanol radical, ethanol radical, propanol radical, isopropanol radical, butanol radical, isobutanol radical, t-butanol radical, pentanol radical, hexanol radical, or heptanol radical.

"Alkyl radical" is understood to mean all groups falling under the general chemical definition of an alkyl radical, in particular methyl radicals, ethyl radicals, propyl radicals butyl radicals, isopropyl radicals, isobutyl radicals, tertiary butyl radicals, cyclopropyl radicals, cyclopentyl radicals, cyclohexyl radicals, cycloheptyl radicals as well as longer-chain branched or unbranched or cyclic alkyl radicals.

The process is preferably characterized in that the polyurethane foam is produced from a reaction mixture which contains:

a polyisocyanate component having an NCO content of 25 to 48.3 wt. %, consisting of pure or modified toluylene diisocyanate or an optionally modified polyisocyanate or polyisocyanate mixture of the diphenylmethane series and a polyol component of an average hydroxyl functionality of 2–6 consisting of at least one polyether polyol or polyester polyol having OH numbers<70, optionally with addition of conventional auxiliaries and additives, as are known from polyurethane chemistry.

The reaction mixture may also preferably contain polyester polyols or polyether polyols or mixtures thereof having OH numbers from 70–400.

Suitable isocyanate components are generally aliphatic, cycloaliphatic, araliphatic, aromatic and heterocyclic polyisocyanates, as described, for example by W. Siefken in Justus Liebigs Annals of Chemistry, 562, pages 75 to 136 is hereby incorporated by reference. Preferred are those of the formula $Q(NCO)_n$, in which n=2 to 4, preferably 2, and Q denotes an aliphatic hydrocarbon radical having 2 to 18, preferably 6 to 10, C atoms, a cycloaliphatic hydrocarbon radical having 4 to 15, preferably 5 to 10, C atoms, an aromatic hydrocarbon radical having 6 to 15, preferably 6 to 13, C atoms, or an araliphatic hydrocarbon radical having 8 to 15, preferably 8 to 13, C atoms, for example those polyisocyanates as described in German Patent No. 2,832,253, that was filed on Jul. 22, 1978 and issued on Jan. 31, 1980, pages 10 to 11, which is hereby incorporated by reference.

The known polyisocyanates, such as 2,4-toluylene diisocyanate and 2,6-toluylene diisocyanate as well as any mixtures of these isomers ("TDI"), polyphenyl polymethylene polyisocyanates, as produced by aniline-formaldehyde condensation and subsequent phosgenation, ("crude MDI") and polyisocyanates having carbodiimide groups, urethane groups, allophanate groups, isocyanurate groups, urea groups or biuret groups ("modified polyisocyanates"), in particular those modified polyisocyanates which are derived from 2,4-toluylene diisocyanate and/or 2,6-toluylene diisocyanate or from 4,4'-diphenylmethane diisocyanate and/or 2,4'-diphenylmethane diisocyanate, are particularly preferred.

The polyisocyanate component is preferably liquid at 20° C. and has an NCO content of 25 to 48.3 wt. %, preferably of 48.3 wt. %. It is preferably a pure or modified toluylene diisocyanate or at least one, optionally chemically modified, polyisocyanate or polyisocyanate mixture of the diphenylmethane series.

These are understood to mean in particular 4,4'-diisocyanato diphenylmethane, its technical mixtures with 2,4'-diisocyanato diphenylmethane and optionally 2,2'-diisocyanato diphenylmethane or mixtures of these diisocyanates with their higher homologues, which occur in the phosgenation of aniline/formaldehyde condensates and/or obtained in the working up by distillation of such phosgenation products. The "chemical modification" of these polyisocyanates is in particular the urethane modification by reacting up to 30 percent of the existing NCO groups with polypropylene glycols of a maximum molecular weight of 700 or carbodiimidisation made up of up to 30% of the existing NCO groups.

The polyether polyols being using contain at least two hydrogen atoms which are reactive with respect to isocyanates and have hydroxyl numbers of 20 to 400. They are obtained by polyaddition of alkylene oxides, such as ethylene oxide, propylene oxide, butylene oxide, dodecyl oxide, or styrene oxide, but preferably propylene oxide or ethylene oxide to starter compounds, such as water, propylene glycol, ethylene glycol, glycerol, trimethylolpropane, pentaerythritol, sorbitol or others.

Suitable polyester polyols are the esterification products of preferably divalent alcohols having hydroxyl groups, such as ethylene glycol, diethylene glycol, propylene glycol, neopentyl glycol, 1,4-butane diol, 1,6-hexane diol with excess quantities of preferably difunctional carboxylic acids, such as succinic acid, adipic acid, phthalic acid, tetrahydrophthalic acid, hexahydrophthalic acid or mixtures of such acids.

Carbamates which are essential to the invention, as well as known additives are used as auxiliaries and additives.

The carbamates, which are essential to the invention, are compounds of the general formula already mentioned above, wherein the variables $R_1$ to $R_5$ and n have the meaning already mentioned above.

Those carbamates of the following general Formula I are preferably used,

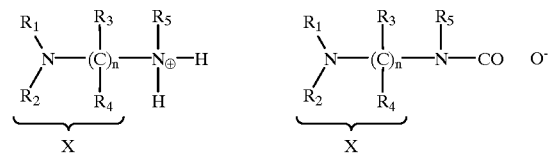

wherein:

$R_5$ denote hydrogen, an alkyl radical or the radicals characterized by X.

$R_1$ and $R_2$ denote methyl radicals.

$R_3$ and $R_4$ denote hydrogen and n represents 3.

Furthermore, those carbamates are preferred, in which $R_5$ denotes an alkanol radical, $R_1$ and $R_2$ denote methyl radicals and $R_3$ and $R_4$ represent the same or different radicals and denote hydrogen or alkyl radicals.

The production of carbamates may be effected by simple saturation of the basic diamines of the following formula hereinafter referred to as "Formula II":

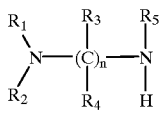

with gaseous or solid carbon dioxide at temperatures between 40 and 130° C., with or without use of a suitable solvent. Water has proven to be particularly suitable as the solvent for the flexible block foams or molded foams under discussion.

3-Dimethylaminopropylamine and bis-3-dimethylaminopropylamine are particularly preferred for producing the carbamates, or mixtures of these amines.

Water is preferably used as further propellant for the foams of the invention. Water produces carbon dioxide by the reaction with isocyanate. The co-use of liquid or gaseous carbon dioxide is possible for certain foam qualities. Other physical propellants may be co-used, but are not preferred.

When carrying out the process of the invention, the carbamate used as catalyst is used in a quantity of less than 8 wt. %, preferably 0.1 to 6%, also preferably 0.3 to 4 wt. %, based on the weight of component B).

Further auxiliaries and additives that can be used are those which are conventional in the production of polyurethane foams, such as activators or stabilisers. Further possible auxiliaries and additives are surfactant additives and foam stabilisers as well as cell regulators, reaction retarders, stabilisers, flame-inhibiting substances, plasticizers, dye-stuffs and fillers, and substances with fungistatic and bacteriostatic action. Details on the mode of use and mode of action of these additives are given in Kunststoff-Handbuch [Plastic Handbook], Volume VII, publisher Vieweg and H öchtlen, Carl Hanser Verlag, Munich 1966, page 103–113, which is hereby incorporated by reference.

The starting components are moreover used in those quantities which correspond to an isocyanate characteristic of 80 to 120, but preferably 95 to 105.

Furthermore, at least one co-catalyst may additionally be used, for example a metal catalyst, such as dibutyl tin dilaurate or tin dioctoate.

The reaction components are reacted according to the invention by the one-pot process, the prepolymer process or the semi-prepolymer process, wherein machine devices are often operated such as those which are described in U.S. Pat. No. 2,764,565, which is hereby incorporated by reference. Details on processing devices which are also suitable according to the invention, are described in the Kunststoff-Handbuch [Plastic Handbook], loc. cit., page 121–205, which is hereby incorporated by reference.

During foam production, foaming may also be carried out according to the invention in closed molds. The reaction mixture is thus introduced into a mold. Metal, such as aluminum, or plastic, such as epoxy resin, is suitable as mold material.

The foamable reaction mixture foams in the mold and forms the molding. Mold foaming may thus be carried out so that the molding has cellular structure on its surface. In this context it is possible to proceed according to the invention so that so much foamable reaction mixture is introduced into the mold that the foam formed just fills the mold.

However, it is also possible to proceed so that more foamable reaction mixture is introduced into the mold than is necessary to fill the interior of the mold with foam. In the latter case, work is thus carried out under "overcharging"; such a procedure is known from U.S. Pat. Nos. 3,178,490 and 3,182,104, which are hereby incorporated by reference.

During mold foaming, often "external separating agents", such as silicone oils are used. However, of course foams may also be produced by block foaming.

The use of tertiary amines to produce polyurethane block foams could not be omitted in the state of the art. Problems with the mechanical polyurethane foam properties or oxidative core discoloration, which exclude further use, could not be avoided, if catalysts which can be incorporated only via amine or hydroxyl functions are used.

The foams produced according to the invention are preferably flexible block foams, which are intended for use in the automobile industry and the furniture industry. The block foams of the invention may also advantageously be used for lamination.

EXAMPLES

To carry out the process of the invention during block foaming, all components may be metered in separately, combined in a mixing chamber and then applied to a paper running at an angle in a manner conventional for block foams. Likewise, it is possible to premix the additives in advance and to meter them in as a third component in the mixing head.

The temperature of the reaction components (polyisocyanate component A) or polyol component) generally lies within the temperature range from 20 to 45° C.

Starting Materials

Polyisocyanate 1:
Toluylene diisocyanate containing 80% of 2,4 isomers and containing 20% of 2,6 isomers.
Polyisocyanate 2:
Toluylene diisocyanate containing 65% of 2,4 isomers and containing 35% of 2,6 isomers.
Polyisocyanate 3:
Polyisocyanate containing 32.5% NCO and having a viscosity of 25 mPa.s, consisting of 15% polymeric MDI, a concentration of 2,4'-diphenylmethane diisocyanate of 24% and a concentration of 4,4'-diphenylmethane diisocyanate of about 64%.
Polyol 1:
Polyester polyol by reaction of adipic acid, diethylene glycol and trimethylolpropane (OH number: 61, acid number 1.4, average functionality 2.5).
Polyol 2:
DESMOPHEN® 2450 manufactured by Bayer Aktiengesellschaft Corporation located at 51368 Leverkusen-Bayerwerk, Federal Republic of Germany. Polyester having an OH number of about 210.
Polyol 3:
Polyether triol of OH number 36 produced by propoxylation of trimethylolpropane with subsequent ethoxylation of the propoxylation product (PO:EO weight ratio~85:15).
Carbamate 1:
$CO_2$ is introduced into 400 g of 3-dimethylaminopropylamine in 400 g of water until saturation. The $CO_2$ mass taken up is 195 g and the viscosity at 25° C. 95 mPa.s.

The odor was determined according to the VDA recommendation 270 variant B-3. The mark 1 therein represents "not perceptible" and mark 6 represents "intolerable."

Examples of Block Foam

The block foams are produced on a commercially available plant UBT from Messrs. Henneke.

All concentration details are in parts by weight.

|  | Example 1 | Example 2 | Comparative Example 1 | Comparative Example 2 |
|---|---|---|---|---|
| Polyol 1 | 87 | 87 | 100 | 100 |
| Polyol 2 | 13 | 13 |  |  |
| Carbamate 1 | 1.2 | 1.4 |  |  |
| N-Methyl-morpholine |  |  | 1.2 |  |
| Dimethylethanol-amine |  |  |  | 0.2 |
| SE 232 (3) | 1.0 | 1.0 |  |  |
| Emulsifier EM[1] |  |  | 2.0 |  |
| Emulsifier TX[1] |  |  | 1.5 |  |
| Dimethyl-piperazine |  |  |  | 0.5 |
| B 8301[3] |  |  |  | 1.0 |
| Tin dioctoate |  |  |  | 0.1 |
| Water | 2.5 | 2.4 | 3.0 | 3.0 |
| Isocyanate 1 | 12.6 | 18.9 | 42 | 42 |
| Isocyanate 2 | 29.4 | 23.2 |  |  |
| Bulk density (g/l) DIN 53420 | 32 | 29 | 31 | 32 |
| Compressive strength (40%) (kPa) DIN 53577 | 3.6 | 3.6 | 3.6 | 3.8 |
| Permanent set (50%) (%) DIN 53572 | 8 | 10 | 7 | 9 |
| Elongation at break (%) DIN 53571 | 327 | 314 | 270 | 283 |
| Tensile strength (kPa) DIN 53571 | 238 | 192 | 193 | 205 |
| Tensile strength after hydrolysis aging (7 days, 70° C., 95% humidity) | 207 | 185 | 172 | 140 |
| Odor | 2 | 1.5 | 5 | 4 |
| Amine determination | <5 ppm | <5 ppm | >60 ppm | >60 ppm |

[1]Commercial product of Bayer Aktiengesellschaft Corporation located at 51368 Leverkusen-Bayerwerk, Federal Republic of Germany.
[2]Commercial product of Goldschmidt
[3]WITCO The amine determination was carried out using commercially available short-term tubes from Messrs. Dräger Sicherheitstechnik GmbH. Hydrolysis aging is poor in comparative example 2, whereas the foam of comparative example 1 has a bad odor.

Production of a Soft Molded Foam According to the Invention:

|  | Example | Comparative Example |
|---|---|---|
| Polyol 3 | 100 | 100 |
| Carbamate 1 | 1,5 | — |
| Toyocat ET[1] | — | 0.2 |
| Dabco 33LV[2] | — | 0.4 |
| Arcol 2580[3] | 2.0 | 2.0 |
| Water | 2.4 | 3.0 |
| Stabiliser B4113[4] | 0.8 | 0.8 |
| Isocyanate | 49.3 | 49.3 |
| Amine determination | <5 ppm | >60 ppm |

[1]Commercial product of Messrs. Tosoh
[2]Commercial product of Messrs. Air Products
[3]Commercial product of Messrs. Lyondell
[4]Commercial product of Messrs. Goldschmidt The polyol is premixed with the materials indicated apart from the isocyanate. In each case the formulation and the isocyanate are mixed with one another on a commercially available high-pressure machine and the reaction mixture is introduced into a 40 liter box mold, which is heated at 50° C. The mold is closed and after about five minutes the molding is removed from the mold. The quantity added is selected so that the molding weight is 2.1 kg. A conventional elastic soft molded foam is produced. The amine determination is carried out after one day of storage in the manner described previously.

We claim:
1. A process for producing polyurethane foam in the presence of at least one catalyst and at least one propellant, wherein a carbamate or a mixture of carbamates of the general formula:

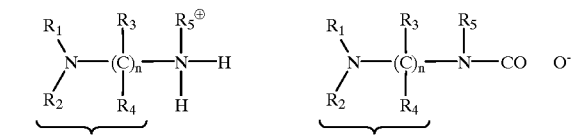

where:
R$_1$ and R$_2$ represent the alkyl radicals,
R$_3$ and R$_4$ represent radicals and denote alkyl radicals,
R$_5$ denotes hydrogen, an alkanol radical, a polyether monool radical or the radical characterized by X,
n represents 2, is used as catalyst and propellant, essentially excluding amine catalysts.

2. The process for producing polyurethane foam according to claim 1, wherein R$_3$ and R$_4$ represent radicals and denote hydrogen.

3. The process for producing polyurethane foam according to claim 1, wherein n represents 3.

4. The process according to claim 1, wherein the polyurethane foam is produced from a reaction mixture which contains:
a polyisocyanate component having an NCO content of 25 to 48.3 wt. %, consisting of pure or modified toluylene diisocyanate or an optionally modified polyisocyanate or polyisocyanate mixture of the diphenylmethane series; and
a polyol component of an average hydroxyl functionality of 2–6 consisting of one or more polyether polyols or polyester polyols.

5. The process according to claim 4, wherein at least 70% of the polyol component has an OH number smaller than 70.

6. The process according to claim 5, wherein the polyol component also contains at least one polyester polyol or polyether polyol or a mixture thereof having an OH number of 70–400.

7. The process according to claim 6, wherein the polyol component also contains at least one polyester polyol or polyether polyol or a mixture thereof having an OH number of 70–400, in a concentration of 0%–20% based on the polyol component.

8. The process according to claim 7, further includes utilizing at least one additional propellant.

9. The process according to claim 8, wherein the propellant is water.

10. The process according to claim 7, further includes utilizing catalysts, auxiliaries and additives.

11. The process according to claim 10, wherein carbamates are used in a quantity of less than 8 wt. % based on the weight of the polyol component in a quantity between 0.1 and 6 wt. %.

12. The process according to claim 10, wherein carbamates are used in a quantity of less than 8 wt. % based on the weight of the polyol component in a quantity between 0.3 and 4 wt. %.

13. The process according to claim 1, wherein the catalysts of the invention are used for producing flexible block foams.

14. The process according to claim 1, wherein the catalysts of the invention are used for producing viscoelastic block foams.

15. The process according to claim 1, wherein the catalysts of the invention are used for producing flexible molded foams.

16. The process according to claim 1, wherein the catalysts of the invention are used for viscoelastic molded foams.

17. A polyurethane foam that includes the presence of at least one catalyst and at least one propellant, wherein a carbamate or a mixture of carbamates of the general formula:

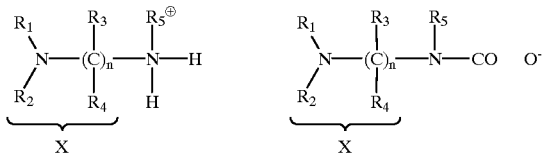

where:
$R_1$ and $R_2$ represent the alkyl radicals,
$R_3$ and $R_4$ represent radicals and denote alkyl radicals,
$R_5$ denotes hydrogen, an alkanol radical, a polyether monool radical or the radical characterized by X,
n represents 2, is used as catalyst and propellant, essentially excluding amine catalysts.

18. The polyurethane foam according to claim 17, wherein $R_3$ and $R_4$ represent radicals and denote hydrogen.

19. The polyurethane foam according to claim 17, wherein n represents 3.

20. The polyurethane foam according to claim 17, wherein the polyurethane foam is produced from a reaction mixture which contains:
a polyisocyanate component having an NCO content of 25 to 48.3 wt. %, consisting of pure or modified toluylene diisocyanate or an optionally modified polyisocyanate or polyisocyanate mixture of the diphenylmethane series;
a polyol component of an average hydroxyl functionality of 2–6 consisting of one or more polyether polyols or polyester polyols.

21. The polyurethane foam according to claim 20, wherein at least 70% of the polyol component has an OH number smaller than 70.

22. The polyurethane foam according to claim 21, wherein the polyol component also contains at least one polyester polyol or polyether polyol or a mixture thereof having an OH number of 70–400.

23. The polyurethane foam according to claim 22, wherein the polyol component also contains at least one polyester polyol or polyether polyol or a mixture thereof having an OH number of 70–400, in a concentration of 0%–20% based on the polyol component.

24. The polyurethane foam according to claim 23, further includes utilizing at least one additional propellant.

25. The polyurethane foam according to claim 24, wherein the propellant is water.

26. The polyurethane foam according to claim 23, further includes utilizing catalysts, auxiliaries and additives.

27. The polyurethane foam according to claim 26, wherein carbamates are used in a quantity of less than 8 wt. % based on the weight of the polyol component in a quantity between 0.1 and 6 wt. %.

28. The polyurethane foam according to claim 26, wherein carbamates are used in a quantity of less than 8 wt. % based on the weight of the polyol component in a quantity between 0.3 and 4 wt. %.

29. The polyurethane foam according to claim 17, wherein the catalysts of the invention are used for producing flexible block foams.

30. The polyurethane foam according to claim 17, wherein the catalysts of the invention are used for producing viscoelastic block foams.

31. The polyurethane foam according to claim 17, wherein the catalysts of the invention are used for producing flexible molded foams.

32. The polyurethane foam according to claim 17, wherein the catalysts of the invention are used for viscoelastic molded foams.

* * * * *